US005728200A

United States Patent [19]

Bekedam

[11] Patent Number: 5,728,200
[45] Date of Patent: Mar. 17, 1998

[54] COMPACT DEAERATOR UNIT AND FEEDWATER SYSTEM

[76] Inventor: Martin Bekedam, 19059 N. 88th Ave., Westbrook Village, Peoria, Ariz. 85382

[21] Appl. No.: 690,480

[22] Filed: Jul. 31, 1996

[51] Int. Cl.$^6$ .................................. B01D 19/00
[52] U.S. Cl. .................. 96/158; 95/185; 95/260; 96/172; 96/173; 96/203; 96/204
[58] Field of Search .................. 95/156, 158, 185, 95/186, 244, 159, 162, 245, 260, 264, 266; 96/157, 158, 173, 174, 181, 202, 203, 204, 206, 220, 160, 172; 261/117, 118, 124, DIG. 32, DIG. 76

[56] References Cited

U.S. PATENT DOCUMENTS

| 1,790,911 | 2/1931 | Gibson | 96/158 |
|---|---|---|---|
| 2,671,524 | 3/1954 | Gilwood | 96/158 X |
| 2,677,433 | 5/1954 | Kretzschmar | 95/244 |
| 2,689,018 | 9/1954 | Kittredge | 95/244 |
| 2,845,137 | 7/1958 | Sebald | 95/244 |
| 2,872,999 | 2/1959 | Spining | 96/203 |
| 3,291,105 | 12/1966 | Stenard | 96/174 X |
| 3,338,033 | 8/1967 | Ross | 96/173 X |
| 3,342,020 | 9/1967 | Ross | 96/203 X |
| 3,487,611 | 1/1970 | Bekedam | 96/160 |
| 3,834,133 | 9/1974 | Bow | 261/118 X |
| 4,698,076 | 10/1987 | Bekedam | 96/173 |
| 4,874,406 | 10/1989 | Bekedam | 96/174 |
| 5,310,417 | 5/1994 | Bekedam | 96/487 |
| 5,405,435 | 4/1995 | Bekedam | 96/181 X |

Primary Examiner—Richard L. Chiesa
Attorney, Agent, or Firm—Bielen, Peterson & Lampe

[57] ABSTRACT

A compact deaerator unit used in combination with a boiler feedwater receiver to eliminate corrosion in the feedwater receiver and in other components of a boiler system. The deaerator unit is mounted external to the feedwater receiver for receiving makeup water and return condensate through a spray nozzle, the deaerator unit in one embodiment having a water level overflow supplying the feedwater receiver with deaerated water and a submerged steam supply and temperature control for maintaining water in the deaerator unit at deaeration temperature, with the water level overflow being separated from the spray nozzle by a baffle, the steam supplied to the deaerator unit first passing through the feedwater receiver to continuously purge the receiver of any corrosive gases and maintain a positive steam pressure.

17 Claims, 2 Drawing Sheets

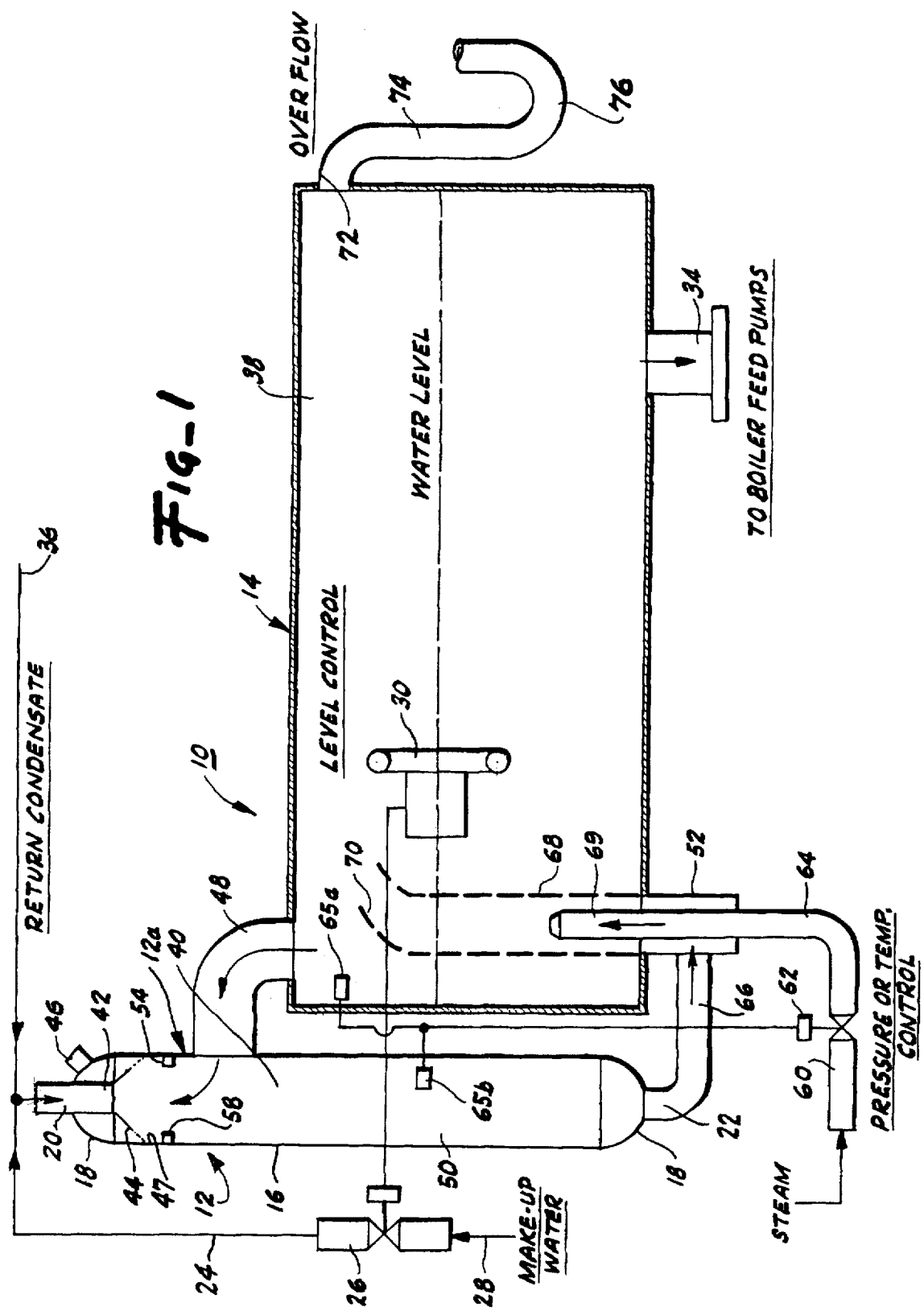

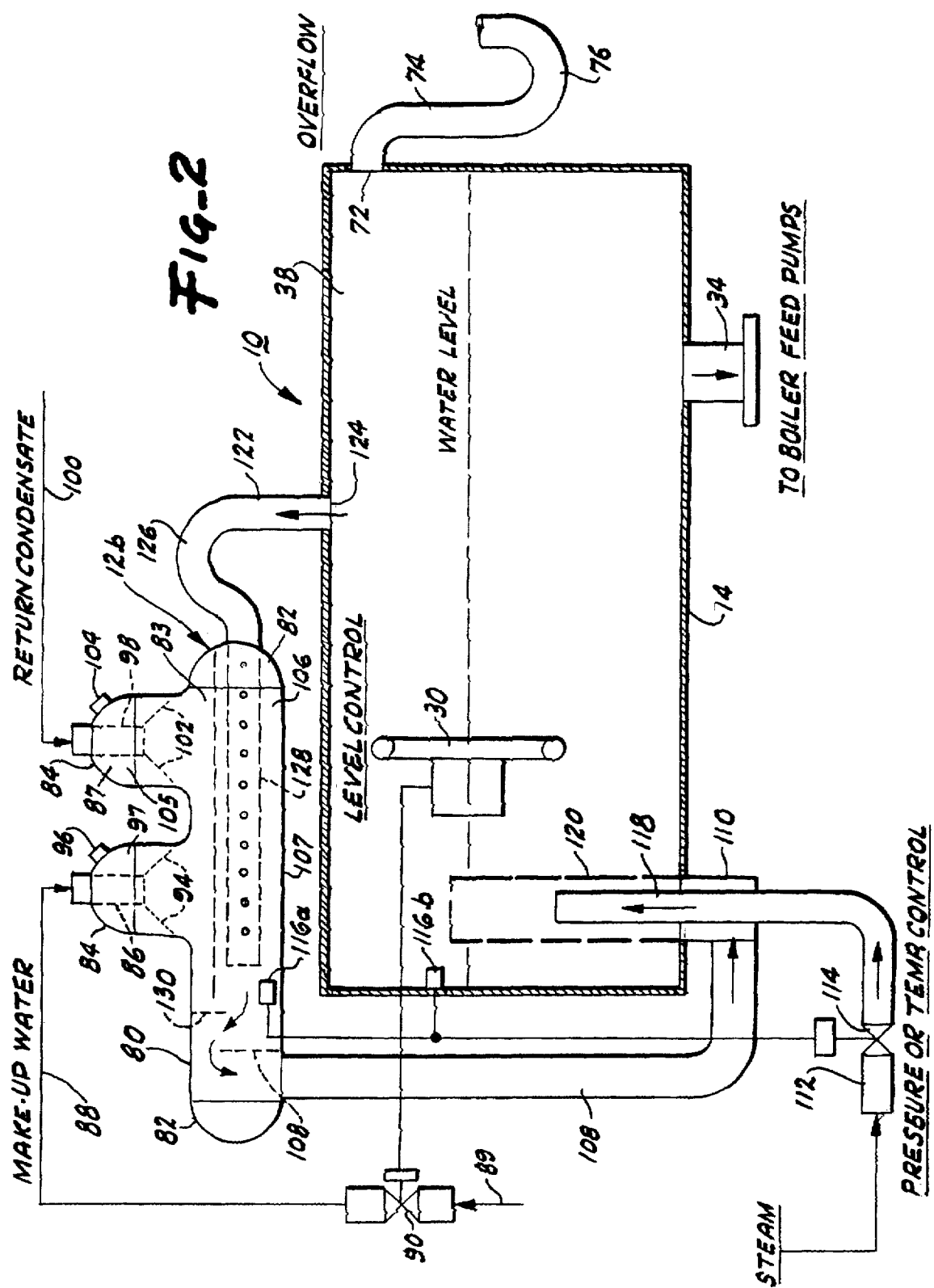

COMPACT DEAERATOR UNIT AND FEEDWATER SYSTEM

BACKGROUND OF THE INVENTION

This invention relates to a compact and inexpensive deaerator unit that is used in conjunction with a boiler feedwater receiver that stores a supply of deaerated feedwater for a boiler system. A typical boiler feedwater receiver comprises a tank holding a supply of water on demand for a boiler system. Untreated water contains gases and salts that are corrosive to components of the boiler system, particularly the boiler pipes in the boiler unit. The boiler pipes are expensive to replace and replacement causes shut-down of the system. In addition to chemical treatment to remove corrosive salts, water is thermally treated to purge the water of gases including oxygen and carbon dioxide which cause corrosion and scaling by oxidation and carbonation of the system components. In prior art systems, the water in the feedwater receiver is heated to just under the boiling point to drive gases from the water. Gases are vented through an open or pressure release vent on displacement by steam and water vapor used to heat the water in the receiver.

This invention relates to certain inexpensive components that provide improvements to the standard feedwater receiver to minimize loss of steam and maximize the deaeration of receiver water. State-of-the-art improvements in the design of feedwater receivers are disclosed in my patents for "Jet Spray Atmospheric Deaerator," U.S. Pat. No. 4,874,406, issued 17 Oct. 1989; and "Atmospheric Deaerator," U.S. Pat. No. 5,310,417, issued 10 May 1994. Similar improvements result in outfitting standard, single compartment, feedwater receivers with the compact external components of the deaerator unit of this invention. With minor adaptation of the single compartment, boiler feedwater receiver, the deaerator unit provides double effect or triple effect deaeration of boiler feedwater.

When deaeration is accomplished within the feedwater receiver, the corrosive gases may act on the internal surfaces of the receiver causing corrosion and substantial loss in the service-life of the receiver. Although improvements disclosed in the reference patents substantially improves deaeration, by using multiple internal compartments to isolate primary and secondary deaeration processes, the solution adds expense to receiver construction and is not a cost effective solution to the problem with existing, single compartment receivers.

The problem of efficient feedwater receiver deaeration in single compartment receivers is resolved by a small compact deaeration unit mounted external to the receiver. Combined with a modified return to the receiver, performance is substantially improved and comparable to the improved systems previously devised by this inventor.

SUMMARY OF THE INVENTION

The compact deaerator unit of this invention is used in a boiler feedwater system to deaerate supply water to a boiler. The deaerator unit is used in conjunction with the boiler water supply, typically a feedwater receiver that receives condensate from the boiler and makeup water from a water source, and supplies deaerated water to the boiler. The feedwater receiver maintains a quantity of processed, deaerated water to meet the varying operational demands of the boiler. The feedwater receiver is connected to an external source of makeup water that may have various degrees of pretreatment, but requires deaeration.

Corrosive gases are primarily introduced into the feedwater from the makeup water and secondarily through the air vent of atmospheric deaerator systems during fluctuations in the operating conditions, particularly during shut-down and startup. Steam from the boiler is used to heat receiver feedwater to close to boiling temperature, which drives gases from the water.

By multiplying the passes of steam through the system water, emphasizing the focus on the most aerated portion of the water, optimized deaeration can be accomplished.

The novel deaerator unit of this invention provides a compact external feedwater deaeration component for feedwater receivers, particularly single compartment receivers. The substantial upgrade in performance is provided by a receiver water intake unit, that may be inexpensively fabricated from pressure piping stock and fittings.

The compact deaerator unit of this invention is a feedwater deaeration component that receives return condensate and makeup water for water spray deaeration by cycled steam. In combination, the deaerator unit and modified feedwater receiver comprise a deaeration system with a double or triple effect in the steam purging process.

Depending on the configuration of the deaeration component in the deaeration system, the steam makes two or three passes at the incoming return condensate and makeup water as it makes its way to the hold of the receiver.

The compact deaerator unit comprises an elongated chamber, preferably cylindrical, that at its uppermost part, has a return condensate and makeup connection with one or more internal spray nozzles for producing a conical spray for primary heating and deaeration of incoming water. The deaerator unit has an internal chamber to receive the deaerated incoming water and temporarily isolate the water from the main water reservoir in the feedwater receiver. Thus, incompletely deaerated water or water proximate the atmospheric vent, which can pick up air drawn through the vent from level changes in the feedwater receiver, is initially separated from the water in the receiver.

Water in the deaerator unit is gravity fed to the receiver through a feed pipe rising from the bottom of the receiver. Steam for maintaining an appropriate deaeration temperature, or pressure, is supplied through a concentric steam supply line within the supply water pipe. In this manner, water supplied from the chamber of the deaeration unit is contacted and mixed with steam expanding into the receiver chamber for a secondary deaeration process. Uncondensed steam fills the volume in the receiver above the water level and continuously purges the volume of uncondensable gases before entering the deaerator unit for primary deaeration of the incoming water spray.

In one preferred embodiment, steam entry to the deaerator unit is through a submerged perforated pipe in the chamber of the deaerator unit. In this manner, the steam must percolate through the separated water of the deaerator unit providing a third pass of the steam for deaeration.

The compact deaerator unit of this invention can be configured as an atmospheric unit using temperature controls to maintain deaeration temperatures at atmospheric pressure, or a pressurized unit using pressure controls and pressure relief devices. Positive steam pressure is maintained in the receiver by the submerged pipe or in the open passage embodiment by a constriction in the air vent.

Preferably, the deaerator unit and receiver have stainless steel surfaces in contact with water for prolonged life. The deaerator unit is designed to be fabricated with standard pipe and fittings to form the housing or shell of the deaerator unit. In this manner, the unit is easily and inexpensively fabricated using off-the-shelf components, such as pregraded pipe stock and welded fittings.

3

These and other features of the system will become apparent on consideration of the Detailed Description of the Preferred Embodiments.

BRIEF DESCRIPTION OF THE DRAWINGS

FIG. 1 is a schematic view of a boiler feedwater system including a first embodiment of the compact deaerator unit of this invention.

FIG. 2 is a schematic view of a boiler feedwater system with a second embodiment of the compact deaerator unit of this invention.

DETAILED DESCRIPTION OF THE PREFERRED EMBODIMENTS

This invention relates to a boiler feedwater system, generally designated by the reference numeral 10 in FIGS. 1 and 2. The boiler feedwater system 10 shown is used with other conventional equipment for supplying and collecting water from a boiler (not shown). The components of the boiler feedwater system 10 of FIGS. 1 and 2 include a compact deaerator unit 12 and a modified feedwater receiver 14. The compact deaerator unit 12 is illustrated and described in two preferred embodiments for purposes of disclosing variations in construction and orientation for the highly efficient, external deaeration unit. The two embodiments are shown in conjunction with a standard, single compartment, feedwater receiver.

Referring to the embodiment of FIG. 1, the deaerator unit 12a is shown as a vertically oriented unit adjacent one end of the receiver 14. The feedwater receiver 14 is essentially a holding tank for prepared water supplied to a boiler on demand. The feedwater receiver 14 shown in FIGS. 1 and 2 is a conventional, single compartment receiver having various optional outlets for configuring the receiver with auxiliary components in a particular system. To prolong the life of the feedwater receiver 14 and the deaerator unit 12a, the deaerator unit and receiver are preferably lined with stainless steel, at least where internal surfaces are in contact with the contained water. The deaerator unit 12a has an elongated cylindrical housing 16, formed of a segment of pressure pipe, and end caps 18 formed by welded reduction couplings, providing for a connected water intake 20 and a water discharge 22.

The water intake 20 is connected to a water makeup line 24 connected to an electronic control valve 26, which in turn is connected to a water source line 28 for providing makeup water under pressure to the deaerator unit 12a, and ultimately to the feed water receiver 14. The control valve 26 is electronically controlled by a water level control sensor 30 within the feed water receiver 14 for maintaining the water level in the receiver within a defined operating range.

The feedwater receiver 14 functions as a surge tank to accommodate the varying demands of a boiler and its cooperating equipment such as turbines, heaters and condensers. The boiler water is drawn from the receiver through a receiver outlet 34, and pumped to the boiler. During operation of a boiler system, spent steam is condensed, collected and pumped to the feedwater receiver 14 via a return condensate line 36. The capacity of an internal chamber 38 within the feedwater receiver 14 must therefore be adequate to handle surges in drawing and returning water to the receiver. Additionally, loss of steam during system operation must be made up from an external water source. Before the condensate is returned to the receiver or makeup water is added to the receiver, the water is first deareated to prevent corrosion to the receiver or to the other components in the boiler system.

4

In the embodiment of FIG. 1, it is understood that the return condensate is under pressure or pumped to the deaeration unit 12a, since it is commingled with any makeup water being supplied from a pressurized makeup water source (not shown) at the intake 20 to the deaerator unit. The combined supply water is sprayed into an internal chamber 40 within the deaerator unit 12a by a spray nozzle 42. The spray nozzle 42 develops a conical spray 44 proximate the top of the deaerator unit 14 below a vent 46 to the atmosphere and separates a top compartment 47 from the remainder of the chamber 40.

The deaerator unit 12a has a steam intake conduit 48 ported through the side of the housing 16 below the water spray 44. The conduit 48 connected to the top of the feedwater receiver 14 admits steam into the deaerator unit from the receiver to contact the water spray 44. Steam is condensed by the water spray 44, and the spray water is concurrently elevated in temperature to drive uncondensable gases from the water and out the vent 46. Spray water falls to a water reservoir 50 in the chamber 40. Water is maintained at the level of the water within the receiver by the open connection of the supply water discharge 22 on the bottom of the deaerator unit 12a with a supply water intake 52 at the underside of the receiver 14. To prevent any spray water from entering the feedwater receiver through the steam conduit 48, the chamber 40 includes an internal ring 54 in the housing 16 to provide a drip lip 58 to direct the spray water and steam condensate to the reservoir 50 within the deaerator unit 12a.

Steam is supplied from the boiler through a steam supply line 60 that is regulated by an electronic control valve 62 before entering the receiver 14 through a steam line 64. The control valve 62 is regulated by a pressure sensor 65a in the feedwater receiver 14 positioned above the level of water, or a temperature sensor 65b submerged in water, preferably in the water reservoir 50 of the deaerator unit 12a. To optimize deaeration, the steam line 64 to the receiver 14 is mounted concentric with the supply water intake 52 to the receiver 14.

From the internal reservoir 50 within the housing 16 of the deaerator unit, deaerated water flows from the bottom of the reservoir 50 through the discharge 22 and interconnection line 66 to a vertical, discharge column 68 within the receiver 14.

The vertical, discharge section 69 of the steam supply line 64 is located within the supply water discharge column 68. The steam supply line discharges steam from a nozzle 71 within the column, which expands, blowing out the supply water as the steam blasts through the dispersing supply water contained within the column. In this manner, the supply water is again directly contacted by steam and heated to drive any remaining incondensable gases from the supply water, and thereby creating the double effect.

The end 70 of the column 68 in the arrangement shown, is bent to deflect steam from direct entry into the steam conduit 48 supplying steam to the deaerator unit. This arrangement allows steam to circulate in the volume of the receiver chamber 38 above the water level to continuously drive any incondensable gases from the receiver 14 to the deaerator unit 12a.

The feedwater receiver 14 has an overflow outlet 72 with an overflow tube 74 that preferably includes a water trap loop 76 to prevent escape of steam except under overpressurization conditions. The loop 76 also allows operation of the system 10 as a low pressure system with appropriate low pressure relief valving at the vent 46.

Notably, the system 10c an be operated as an atmospheric system where the sensor 65b is a temperature sensor controlling operation of the steam control valve 62 with an open deaerator unit vent 46 or as a low pressure system where the sensor 65a is a pressure sensor with a protected vent 46.

Referring now to FIG. 2, the boiler feedwater system 10 includes a deaerator unit 12b and a feedwater receiver 14 with the deaerator unit 12b oriented horizontally above the feedwater receiver 14.

The deaerator unit 12b has a cylindrical housing 80 with end caps forming an internal chamber 83 with two top spray domes 84 for separate primary deaeration of the makeup water and return condensate. It is to be understood a single dome with commingled water may be employed as in the embodiment of FIG. 1. Again, the unit can be fabricated from conventional sections of piping and welded fittings such as tees and caps.

The deaerator unit 12b includes a makeup water spray nozzle 86 connected to a makeup water line 88 with water flow from a pressurized water source line 89 controlled by an electronic control valve 90, electrically controlled by a water level control sensor 30 within the feedwater receiver 14. The spray nozzle 86 creates a conical spray 94 below a top vent 96, with the spray 94 separating a top compartment 97 within the dome 84 from the internal chamber 83.

Similarly, the deaerator unit 12b includes a return condensate spray nozzle 98 connected to a return condensate line 100 to develop a conical spray 102 below a top vent 104 with the spray 102 separating a top compartment 105 from the internal chamber 83.

The sprayed water contacts steam and with the steam condensate resulting from heating the spray water and cooling the system, collects in a chamber 106 in a reservoir 107 in the deaerator unit 12b. The water level is maintained by an internal water baffle, forming a dam with excess water spilling to a vertical discharge pipe 108 that feeds supply water to a supply water intake 110 at the underside of the feedwater receiver 14. Notably, the heated supply water in the vertical discharge pipe 108 is temporarily isolated from the water in the receiver 14 and subject to further deaeration.

Steam from the boiler is supplied to the receiver 14 and deaerator 12b from a steam supply line 112 under control of an electric control valve 114, alternatively regulated by a temperature sensor 116a or a pressure sensor 116b. The temperature sensor 116a is preferably submerged in the water contained in the deaerator unit 12a and the pressure sensor 116b is preferably positioned in the volume of the internal chamber 38 of the receiver 14 above the water level. The steam discharge pipe 118 is concentrically located within a vertically oriented, supply water discharge column 120 allowing the steam to flow the deaerated supply water out the supply water intake 110 of the receiver. This provides a first pass of the steam to finalize deaeration of the supply water before it is commingled with the water in the chamber 38 of the receiver 14.

After purging the volume of the receiver chamber 38 above the water level of incondensable gases, the steam enters the steam intake conduit 122 of the deaerator unit 12b through a port 124 on the top of the receiver 14. The steam intake conduit 122 has a loop trap 126 to prevent collected spray water in the chamber 106 of the deaerator unit 12b from entering the receiver through the steam conduit 122. The terminal end segment 128 of the steam conduit 122 is submerged under the collected supply water and perforated to pass the steam a second time through the supply water.

A depending baffle 130 in the deaerator chamber 106 prevents surface water from immediately passing from the deaerator unit 12b. The steam is directed at the incoming sprays 94 and 102, for the third pass at the supply water. The baffle 130 may be perforated above the water level allowing any incondensable gases released by the water column in the vertical discharge pipe 108 to escape to the vented compartments.

The repeated steam contact at different stages in the deaeration of the supply water insures prolonged heating and maximum deaeration of the supply water before it is commingled with the deaerated water in the feedwater receiver.

In the embodiment of FIG. 2, the vents 96 and 104 can be open to atmosphere with the receiver efficiently operating at slight pressure due to the submerged discharge segment 128 of the steam conduit 122 leading from the receiver 14 to the deaerator unit 12b.

Where a pressurized system is desired, with greater than nominal pressure, the vents are appropriately equipped with pressure relief means and the steam control valve is regulated by a pressure sensor 116b, located in the feedwater receiver above the level of water.

The boiler feedwater system of this invention is designed to provide an inexpensive alternative to the more sophisticated deaerator systems of the type disclosed in the referenced patents. The system devised allows retro-fit of in-place feedwater receivers or substantial upgrade in the deaeration capabilities of standard feedwater receivers.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In a boiler feedwater system having a feedwater receiver with an internal chamber for containing boiler feedwater at an operational level, a steam supply, a makeup water supply, and a return condensate supply, the improvement comprising:

a compact deaerator unit located external to the feedwater receiver, the deaerator unit having:

an elongated housing having an internal chamber means for containing supply water within the chamber means at a defined water level, the chamber means having a volume above the water level;

a top compartment in the housing with a vent means for venting incondensable gases from the chamber means, and a supply water spray means for spraying supply water from the makeup water supply and the return condensate supply in a spray pattern separating the top compartment from the internal chamber means;

a makeup water supply connection means for connecting the makeup water supply to the supply water spray means;

a return condensate supply connection means for connecting the return condensate supply to the supply water spray means;

a steam supply connection means for connecting the steam supply to the feedwater receiver and delivering a supply of steam to the internal chamber below the level of contained boiler feedwater;

first control means for controlling the makeup water supply to the supply water spray means in response to the water level in the feedwater receiver;

second control means for controlling the steam supply to the feedwater receiver;

a steam conduit means between the feedwater receiver and the deaerator unit for interconnecting the volume above the water level in the internal chamber of the feedwater receiver with the internal chamber means of the deaerator unit with a gas passageway;

a supply water conduit means between the deaerator unit and the feedwater receiver for interconnecting the internal chamber means of the deaerator unit with the internal chamber of the feedwater receiver below the level of feedwater in the chamber with a water passageway wherein the compact deaerator unit is positioned with at least the vent means and the top compartment of the housing of the deaerator unit elevated above the internal chamber of the feedwater receiver.

2. The improvement of a boiler feedwater system of claim 1, wherein the elongated housing of the deaerator unit is vertically oriented and positioned adjacent the feedwater receiver, the housing having a top end containing the top compartment and a bottom end with the supply water conduit means is connected to the bottom end of the housing.

3. The improvement of a boiler feedwater system of claim 2 wherein the defined water level within the chamber means of the deaerator unit corresponds to the operational level of feedwater in the feedwater receiver.

4. The improvement of a boiler feedwater system of claim 1 wherein the first control means comprises an electronic control valve in the makeup water supply connection means and water level sensor means in the internal chamber of the feedwater receiver for sensing the level of feedwater in the feedwater receiver.

5. The improvement of a boiler feedwater system of claim 1, wherein the steam supply connection means comprises a steam discharge pipe discharging steam into the internal chamber of the feedwater receiver.

6. The improvement of a boiler feedwater system of claim 5, wherein the supply water conduit means includes a discharge column in the internal chamber of the feedwater receiver, and wherein the steam discharge pipe is located within the discharge column.

7. The improvement of a boiler feedwater system of claim 1 wherein the second control means comprises an electronic control valve in the steam conduit means and a temperature sensor.

8. The improvement of a boiler feedwater system of claim 1 wherein the second control means comprises an electronic control valve in the steam conduit means and a pressure sensor.

9. The improvement of a boiler feedwater system of claim 1 wherein the housing of the deaerator unit is fabricated from piping stock and fittings.

10. The improvement of a boiler feedwater system of claim 1 wherein the housing of the deaerator unit is lined with stainless steel.

11. The improvement of a boiler feedwater system of claim 1 wherein the feedwater receiver has an overflow outlet.

12. The improvement of a boiler feedwater system of claim 1 wherein the elongated housing is horizontally oriented and the housing has at least one top dome containing the top compartment and the supply water spray means.

13. The improvement of a boiler feedwater system of claim 12 Wherein the dome includes the vent means and the internal chamber means has a water baffle means for maintaining the defined level of water in the deaerator unit.

14. The improvement of a boiler feedwater system of claim 13 wherein the chamber means has an end portion and the supply water conduit means is connected to the end portion of the chamber means with the water baffle separating the end portion of the chamber means from the remaining chamber means.

15. The improvement of a boiler feedwater system of claim 13 wherein the steam conduit means has a perforated end segment in the deaerator unit positioned below the defined level of water in the chamber means.

16. The improvement of a boiler feedwater system of claim 15 wherein the chamber means of the deaerator unit has a depending baffle means for blocking surface water.

17. A boiler feedwater system having a steam supply, a makeup water supply, and a return conduit supply comprising:

a feedwater receiver with an internal chamber for containing boiler feedwater at an operational level; and, a compact deaerator unit, the compact deaerator unit having:

an elongated housing having an internal chamber means for containing supply water within the chamber means at a defined water level, the chamber means having a volume above the water level;

a top compartment in the housing with a vent means for venting incondensable gases from the chamber means, and a supply water spray means for spraying supply water from the makeup water supply and the return condensate supply in a spray pattern separating the top compartment from the internal chamber means;

a makeup water supply connection means for connecting the makeup water supply to the supply water spray means;

a return condensate supply connection means for connecting the return condensate supply to the supply water spray means;

a steam supply connection means for connecting the steam supply to the feedwater receiver and delivering a supply of steam to the internal chamber below the level of contained boiler feedwater;

first control means for controlling the makeup water supply to the supply water spray means in response to the water level in the feedwater receiver;

second control means for controlling the steam supply to the feedwater receiver;

a steam conduit means between the feedwater receiver and the deaerator unit for interconnecting the volume above the water level in the internal chamber of the feedwater receiver with the internal chamber means of the deaerator unit with a gas passageway;

a supply water conduit means between the deaerator unit and the feedwater receiver for interconnecting the internal chamber means of the deaerator unit with the internal chamber of the feedwater receiver below the level of feedwater in the chamber with a water passageway wherein the compact deaerator unit is positioned with at least the vent means and top compartment of the housing of the deaerator unit elevated above the internal chamber of the feedwater receiver.

* * * * *